United States Patent
Geller et al.

(10) Patent No.: US 7,523,445 B1
(45) Date of Patent: Apr. 21, 2009

(54) METHOD FOR GENERATING AN EXPLANATION OF A CSP SOLUTION

(75) Inventors: Felix Geller, Adiswil (CH); Ronny Morad, Hafia (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/954,895

(22) Filed: Dec. 12, 2007

(51) Int. Cl.
*G06F 9/44* (2006.01)
*G06G 1/00* (2006.01)

(52) U.S. Cl. .......................... 717/126; 717/104; 706/19
(58) Field of Classification Search ................ 717/104, 717/114, 117, 124, 126, 134, 135; 706/19
See application file for complete search history.

(56) References Cited

U.S. PATENT DOCUMENTS

| | | | |
|---|---|---|---|
| 6,031,984 A | | 2/2000 | Walser |
| 7,260,562 B2 * | | 8/2007 | Czajkowski et al. .......... 706/46 |
| 2003/0167110 A1 * | | 9/2003 | Smith et al. ..................... 701/3 |
| 2004/0117772 A1 | | 6/2004 | Brand et al. |
| 2005/0108036 A1 * | | 5/2005 | Andreoli et al. ................ 705/1 |
| 2005/0278702 A1 | | 12/2005 | Koyfman et al. |
| 2007/0129930 A1 | | 6/2007 | Peralta et al. |
| 2007/0150427 A1 * | | 6/2007 | Geib ........................... 706/45 |
| 2007/0226164 A1 * | | 9/2007 | Geib et al. ..................... 706/52 |
| 2008/0178187 A1 | | 7/2008 | Altshuler et al. |

FOREIGN PATENT DOCUMENTS

WO   WO 0179993 A2   10/2001

OTHER PUBLICATIONS

Bordeaux, L. et al., "Propositional Satisfiability and Constraint Programming: A comparative survey," ACM Computing Surveys (CSUR), vol. 38, Issue 4 (2006), DOI Bookmark: doi.acm.org/10.1145/1177352.1177354.

Versata, Inc., Fair Disclosure Wire, "Webcast on Business Rules Technologies—Part I," Fair Disclosure Wire, Apr. 7, 2005. Copyright © 2005: Voxant Inc. World Reporter. © 2008 Dialog® File No. 20 Accession No. 41907531.

Mouhoub. M.: Sukpan, A., "A New Temporal CSP Framework Handling Composite Variables And Activity Constraints, Tools With Artificial Intelligence," ICTAI 05. 17th IEEE International Conference on. 2005 p. 7, volume, Issue, Nov. 14-16. Digital Object Identifier 10.1109/ICTAI.2005.14.

(Continued)

*Primary Examiner*—Lewis A Bullock, Jr.
*Assistant Examiner*—Jason Mitchell
(74) *Attorney, Agent, or Firm*—Scully, Scott, Murphy & Presser, P.C.; Suzanne Erez

(57) ABSTRACT

The invention provides a computer-implemented method for generating a solution to a constraint satisfaction problem (CSP). The method operates to implement various steps that include defining the CSP problem by a set of variable having finite domains, and constraints defined over the variables, solving the CSP by assigning values to said variables that are consistent with the constraints and debugging the CSP solution. The debugging of the CSP solution is carried out by iteratively executing a propagator to reduce the variable domain. Augmenting the constraints is carried out to supply an explanation for particular values assigned to the variables, and constraints defined over the variable utilized in the solution.

2 Claims, 2 Drawing Sheets

OTHER PUBLICATIONS

Figure 1:
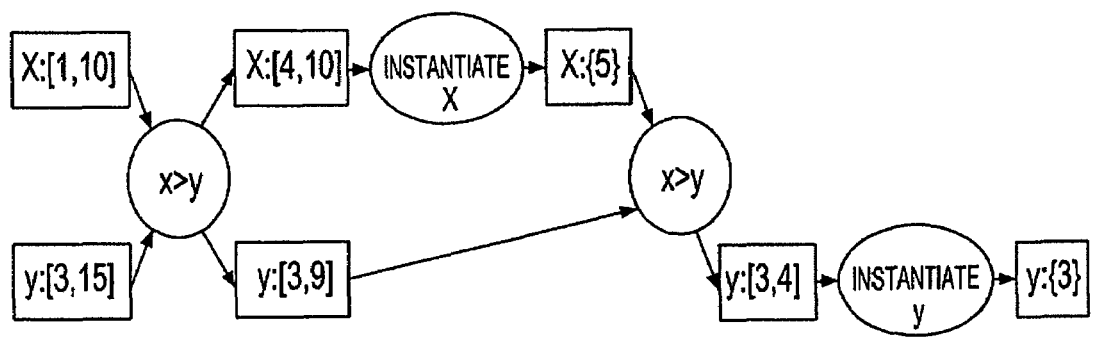

Pachet, F., Roy, P., "Integrating Constraint Satisfaction Techniques With Complex Object Structures," 15th Annual Conference of the British Computer Society, 1995—www-ftp.lip6.fr.

Richards, A., et al., "Decentralized Model Predictive Control Of Cooperating UAVs," Decision and Control, 2004. CDC. 43rd IEEE Conference on, Dec. 14-17, 2004, pp. 4286-4291, vol. 4, Issue.

Sahinidis, N. V., "Global Optimization And Constraint Satisfaction: The Branch-And-Reduce Approach," Conference: Global Optimization And Constraint Satisfaction—International Workshop, Lecture Notes In Computer Science, 2003; pp. 1-16, No. 2861, Publisher: Berlin, New York, Springer-verlag, Dialog® File No. 65 Accession No. 4811142, Inside Conferences Item id: CN050198388.

Saraswat, V. A., "The Semantic Foundations Of Concurrent Constraint Programming," Annual Symposium on Principles of Programming Languages, Proceedings of the 18th ACM SIGPLAN-SIGACT Symposium on Principles of Programming Languages, Year of Publication: 1991, p. 333-352.

Stanelle, S.E. Fu, L.-M., "Analysis of Three Algorithms For Finding all Consistent Labelings," in: Systems, Man and Cybernetics, 1990. Conference Proceedings, IEEE International Conference on Publication Date: Nov. 4-7, 1990. On pp. 605-610, Digital Object Identifier: 10.1109/ICSMC.1990.142184.

Ferrand, G., et al., "Value withdrawal explanation in CSP," AADEBUG 2000: fourth international workshop on automated debugging, Munich, Aug. 28-30, 2000.

Freuder, E.C., et al., "Deriving explanations and implications for constraint satisfaction problems," 7th International Conference, CP 2001. Proceedings (Lecture Notes in Computer Science vol. 2239), pp. 585-589. INSPEC (Dialog® File 2): (c) 2007 Institution of Electrical Engineers.

Sqalli, M.H., et al., "Inference-Based Constraint Satisfaction Supports Explanation," Conference; Artificial intelligence—National conference: 13th Proceedings of the National Conference on Artificial Intelligence, 1996; No. 13//VI, pp. 318-325.

Sullivan, O., et al., "Corrective Explanation for Interactive Constraint Satisfaction," Conference: International joint conference on artificial intelligence; IJCAI-05—19th. International Joint Conference on Artificial Intelligence, 2005; vol. 19, pp. 1531-1532.

Achlioptas, D., "On the Solution-Space Geometry of Random Constraint Satisfaction Problems," STOC'06: Proceedings of the 38th Annual ACM Symposium on Theory of Computing. 2006, Publisher: ACM, New York, pp. 130-139.

Bhansali, S., et al., "A Principled Approach Towards Symbolic Geometric Constraint Satisfaction," Journal of Artificial Intelligence Research, vol. 4, 1996. Publisher: AI Access Foundation & Morgan Kaufmann Publishers, Country of Publication: USA.

Cambazard, H., et al., "A Reformulation-Based Approach to Explanation in Constraint Satisfaction," Conference: Abstraction, reformulation and approximation, SARA 2007—7th. Lecture Notes in Computer Science, 2007; No. 4612, p. 395-396. Publisher: Berlin, Springer, 2007.

Chitnis, S., "NExSched: Next Generation Logical Spreadsheet for Interactively Solving Constraint Satisfaction Problems," M.S., 2006, The University of Texas at Dallas, Adviser: Gopal Gupta. vol. 45/02 of Masters Abstracts. p. 907.

He, D., et al., "Resolving References to Graphical Objects in Multimodal Queries by Constraint Satisfaction," Conference: International conference on multimodal interfaces; Advances in multimodal interfaces—ICMI 2000—3rd. Lecture Notes in Computer Science, 2000; (NO) 1948, p. 8-15 Publisher: New York, Springer, 2000.

Maneva, E.N., "Belief propagation algorithms for constraint satisfaction problems," Ph.D., 2006, University of California, Berkeley Adviser: Alistair Sinclair. vol. 68/02-B of Dissertation Abstracts International. p. 1079.

Pelov, N., et al., "Logic Programming Approaches for Representing and Solving Constraint Satisfaction Problems: A Comparison," Conference: Logic for programming and automated reasoning—International conference; 7th Lecture Notes in Computer Science, 2000; vol. 1955, p. 225-239.

Santos, E., Jr., "A linear constraint satisfaction approach to cost-based abduction," Artificial Intelligence, 1994, vol. 65, No. 1, p. 1-27.

Sirin, F., "Declarative Reasoning About Moving Objects," Ph.D., 2006, University of Maryland, College Park. Adviser: Dana S. Nau. vol. 67/11-B of Dissertation Abstracts International. p. 6538.

Sung, C.H., "Application of Modern Control Theory in Portfolio Optimization," Ph.D., 2007, Stanford University, Adviser: James A. Primbs. vol. 67/11-B of Dissertation Abstracts International. p. 6720.

Vardi, M., "Constraint Satisfaction in Database Theory," Conference: Principles of database systems; Proceedings of the nineteenth ACM SIGMOD-SIGACT-SIGART symposium on principles of database systems—Symposium; 19th Proceedings of the ACM SIGMOD SIGACT SIGART Symposium on Principles of Database Systems, 2000; 19th, p. 76-85.

Jussein, N., et al. "The PaLM System: Explanation-Based Constraint Programming", Proceedings of TRICS: Techniques for Implementing Constraint programming Systems, a post-conference workshop of CP 2000, pp. 118-133, 2000.

Park, V., "An Empirical Study of Different Branching Strategies for Constraint Satisfaction Problems", A thesis presented to the University of Waterloo in fulfillment of the thesis requirement for the degree of Master Mathematics in Computer Science, Waterloo, Ontario, Canada 2004.

Kowalczyk, "Using Constraint Satisfaction in Genetic Algorithms", Proc. 1996 Australian New Zealand Conf. on Intelligent Information Systems, Nov. 18-20, 1996, Adelaide, Australia, Authorized licensed use limited to New Jersey Institute of Technology, downloaded on Nov. 24, 2008 from IEEE Xplore.

* cited by examiner

METHOD FOR GENERATING AN EXPLANATION OF A CSP SOLUTION

BACKGROUND OF THE INVENTION

The present invention relates to constraint programming, and more particularly relates to a system and method for automatically solving constraint satisfaction problems that provides explanations as to why specific constraints were chosen, and why they do not provide solutions, as the case may be.

Constraint programming may be characterized broadly as declarative programming, a technique by which a program essentially describes what is to be computed (processed). Declarative program is distinguishable with respect to imperative programming, by which a program describes how an output must be computed. Constraint programs are more specifically referred to as constraint satisfaction problems, or CSPs. CSPs operate upon a set of variables, wherein each variable is "constrained" to a set of values. During operation, each CSP constraint may be applied to a subset of the variables within the set of variables, by which the CSP application program restricts the values that the variables may assume. Preparing a CSP to represent a combinatorial problem that occurs in practice is referred to as modeling, where the purpose of constraint solving is to generate solutions to CSP model.

Many problems from different domains, such as combinatorial optimization problems and test generation problems are modeled as CSPs. An example of such a model for a combinatorial optimization problem is described in a paper by Eyal Bin, at al., entitled: Using Constraint Satisfaction Formulations And Solution Techniques For Random Test Program Generation, IBM System Journal, Special Issue on AI, August 2002.

Another common approach to solving CSPs includes the use of a "Maintaining Arc Consistency", or MAC algorithm. MAC algorithms, and constraint problem solving based thereon is described in detail in a paper by A. K. Mackworth, entitled: Consistency In Networks Of Relations, Artificial Intelligence, 8:99-118, 1977. In MAC operation, a constraint is specified by a propagator. Propagators are procedures that filter from the constraint variables' domains values that cannot participate in a solution. An execution of MAC algorithm consists of repeated invocation of constraint propagators, alternating with non-deterministic choices, or assignment of a value or values to a variable.

Often, given a solution to a CSP problem, a user needs to have some understanding as to why specific values or constraints were chosen, or why other values were removed by the constraint propagators. For that matter, where the CSP problem is determined to be unsatisfiable, the user should understand why. The ability to explain the specific values (or lack of them) in a solution is pre-requisite for successful CSP modeling. Successful CSP modeling, for example, would support a task of successfully debugging an imperative program, which ability and successful debugging is a basic need in any successful software development.

For that matter, known CSP debugging is normally performed off-line, and is therefore sometimes referred to by the skilled artisan as "post-mortem." During a MAC execution, a trace of events ("trace") is generated and analyzed afterwards. i.e., post mortem, upon completion of the process. The trace gives rise to a CSP execution graph. A CSP execution graph highlights two kinds of nodes: 1) variable domains and 2) solver events that transform variable domains. There is a directed edge from a variable domain to solver event. The directed edge denotes input of a solver event, and the directed edge from the solver event to an output. FIG. 1 herein is an exemplary embodiment of a CSP model. In this figure x and y are two integer variables with an initial domain of [1,10] and [3,15] respectively. Each oval node "x>y" is a propagation event and the oval node "instantiate x" is an instantiation event.

Finding explanations for the given solution for a CSP execution graph typically requires traversing the graph backwards. Such explanations correspond to a sub-graph of the CSP execution graph, which when viewed as set of variable reductions and propagations, supplies an evidence based reasoning supporting why a specific variable was attributed to or assigned a specific value. There may be numerous explanations for an observed effect, such that a significant shortcoming of the conventional process is that the debugging process typically focuses on a single explanation. While the whole of the CSP execution graph inherently provides what may be described as a global explanation, practical investigation and specific user needs tend to focus on a user's particular interest in a minimal sub-graph (or explanation). The term sub-graph as used herein is meant represent a minimal explanation for an effect if removing an event from a sub-graph doesn't imply or reflect that the event is the basis for the effect, or that the event is not readily inferable from the sub-graph.

Finding a single minimal explanation requires tracking several paths in the execution graph. The task of tracking the several paths to identify a single minimal explanation, when performed manually, is tedious and labor-intensive. Even discovering immediate causes of a variable reduction by analyzing a single constraint invocation is not trivial. An existing constraints programming environment with explanation support, or "Palm," is described by N. Jussien and V. Barichard, in their paper: The PaLM System: Explanation-Based Constraint Programming, Proceedings of TRICS: Techniques For Implementing Constraint Programming Systems. Proceedings of TRICS is a post-conference workshop of CP 2000. "Palm" explicitly requires augmenting the constraint propagators for producing explanations. Similar ideas to those used in the "Palm" system for producing explanations are discussed in a paper by R. J. Wallace, E. C. Freuder, in their paper: Explanations For Whom? In Proc.; CP 2001.

What would be desirable in the art of identifying explanations for given solutions for CSP execution graphs is a system and method that processes and generates explanations in at least two particular cases. The first of the two cases arises where the CSP solver returns no result for the selected variables, i.e., the case of a CSP failure. The second of the two cases arises where the CSP solver returns a specific domain for one of the variables. Moreover, the method preferably would operate offline, or post mortem, and would focus or operate based on a trace generated by the CSP solver.

SUMMARY OF THE INVENTION

To that the, the inventors of this invention disclose a system and method for finding explanations for given solutions, or lack of a solution for CSP execution graphs in the at least two particular cases. The system and method operate in a CSP model to identify explanations describing given solutions for CSP execution graphs that return no result, i.e., the case of a CSP failure, and in a case where the CSP solver returns a specific domain for one of the variables. The system and method preferably operate offline, or post mortem, and focus based on a trace generated by the CSP solver.

The system and method traverse the CSP execution graph backwards in time. During such a reverse traversing, the system and method traverse each propagation node to determine through which variable nodes to advance backwards. Doing so essentially determines which variables contributed to the reduction of a domain of a desired variable. An advantage of such a system and method is that by the novel operation, additional effort from a user for augmenting the constraint propagators to supply an explanation is not required, as is in the operation of prior art systems and methods. For example, the prior art methods and system typically requires that users provide additional efforts in order to realize explanations when operating the Palm explanation-based system. Developing a propagator that supplies an explanation is more complex than developing a propagator that does not supply one. In addition, there exist many constraint-based systems with non-explaining propagators. The present invention is constructed to be operational within such known prior art systems seamlessly, without manual or other adaptations known to be required by the prior art.

BRIEF DESCRIPTION OF THE DRAWING FIGURES

Figure 2:
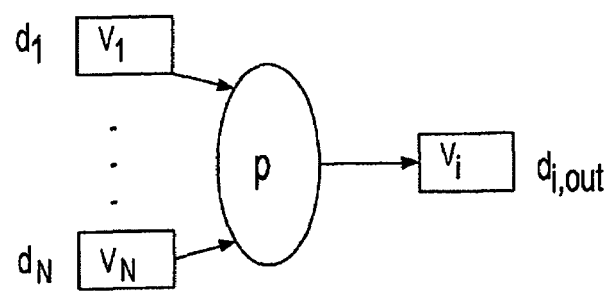
Figure 3:
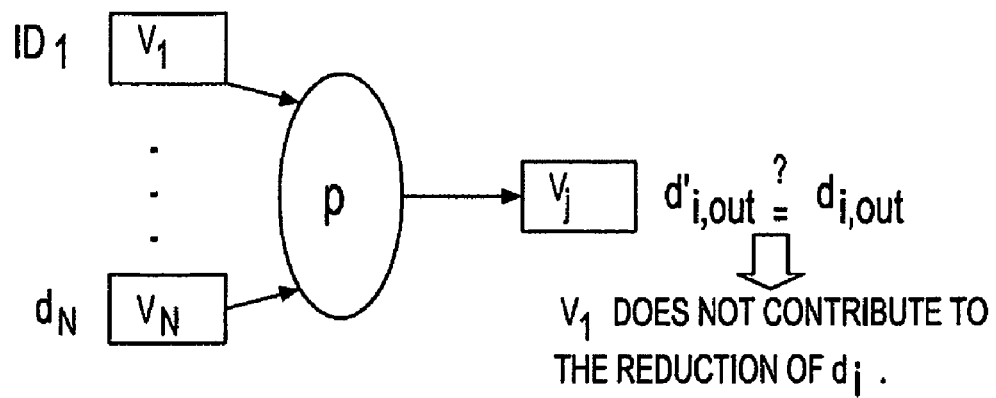
Figure 4:
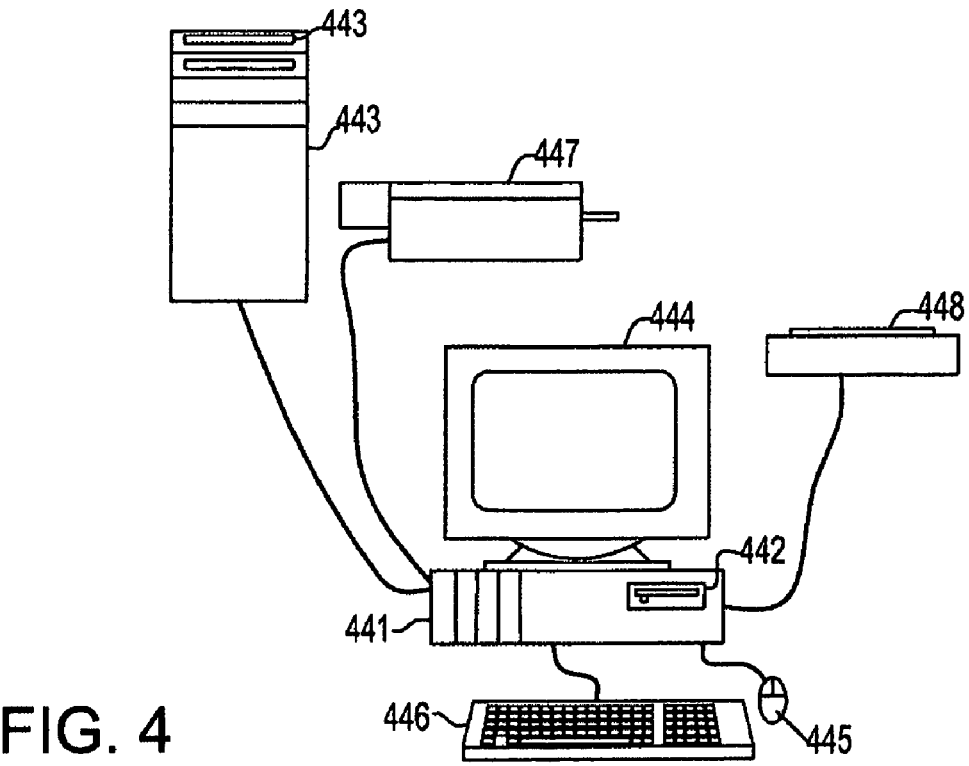

The foregoing and other objects, aspects and advantages will be better understood from the following detailed description of embodiments of the inventions, with reference to the drawings, in which:

FIG. 1 is a diagram depicting a CSP execution graph that is representative of process flow operation of a conventional constraint satisfaction problem (or model);

FIG. 2 is a diagram depicting graphically a reduction of a variable domain in a specific propagation, as provided by the invention; and FIG. 3 is a diagram depicting graphically a reduction of a variable domain in a specific propagation, as provided by the invention, in which v1 is found not to contribute to the reduction of d1; and FIG. 4 is a schematic block diagram depicting a computer system in which the invention may be implemented.

DETAILED DESCRIPTION OF THE INVENTION

The inventive system and method for finding explanations for given solutions, or lack of a solution for CSP execution graphs is set forth and described herein for the purpose of conveying the broad inventive concepts. The drawings and descriptions provided are not meant to limit the scope and spirit of the invention in any way. To that end, reference will now be made in detail to the present invention, examples of which are illustrated in the accompanying drawings, wherein like reference numerals refer to like elements throughout.

In one embodiment, the novel method and algorithm begins operation with the "last" propagation. From that start point, the method determines which variables contributed to the reduction of the domain of the desired variable. Once the variables are identified, the method, for each of the contributing variables, tracks the last propagation that reduced its domain. The method follows the same procedure for each of these propagations. By such novel operation, the system and method traverse the CSP execution graph backwards in time, producing a sub-graph of the CSP execution graph that is presented to the user as the desired explanation.

In more detail, the step or portion of the novel operation that determines which variables contribute to the reduction of a domain of one of the variables in a given propagation is carried out by iteratively executing the same propagator with the same input domains. FIG. 2 herein highlights a propagator (p) and the variable $v_1 \ldots v_N$, corresponding to domains $d_1 \ldots d_N$. The inventive operation requires that each iteration use the initial domain of one of the variables as its input domain instead of its original domain at the time of this particular propagation. Such operation assumes that it is possible to re-execute the propagators several times, preferably offline. The resulting output as shown in FIG. 2, $v_i$, corresponds to $d_{i,out}$. FIG. 3 herein shows the FIG. 2 functioning whereby the first variable $v_1$ is found not to have contributed to a reduction. In FIG. 3 $ID_1$ is the initial domain of $v_1$, and $d_{i,out}$ is the output domain of $v_i$ when the propagator is re-executed with the same inputs for variables $v_2, \ldots, V_N$. When $d_{i,out}=d_{1,out}$ it means that $v_1$ do not contribute to the reduction of $v_i$ in this particular propagation. Otherwise, $v_1$ contributes to the reduction of $v_i$.

The method may be implemented as a set of instructions that are executed by a processor to implement the novel, iterative operation. For that matter, the following is a set of pseudo-code, that when tuned as a set of fully executable computer readable instructions, carries out the novel operation for this algorithm. The pseudo-code for the novel procedure is described in "findLocalExplanation". Instantiation nodes are treated as propagation nodes.

findExplanation(PropagationNode pn, OutputVariable ov):
Graph eg={ }//explanation sub-graph
VariableSet vs=findLocalExplanation(pn, ov)
Foreach v: vs
   Let 1pn be last propagation node that reduced the domain of v
   eg_v=findExplanation(1pn, v)
   eg=UNION(eg, eg_v)
return eg
findLocalExplanation(PropagationNode pn, OutputVariable ov):
//handle case of instantiation node
if pn is an instantiation node then
   Let iv be input node for pn
   return iv
VariableSet vs={ }//affecting variable set
Propagator p=Propagator(pn)//let p be the propagator of pn
//initialize used domains of the input variables
Foreach vi: vi is an input node of pn
   UD(vi)=D(vi)//D(vi) is the domain of variable node vi
Foreach vi: vi is an input node of pn
   d_ov=the output domain of ov returned by the activation of propagator p with inputs:
UD(v1), . . . , ID(vi), . . . , UD(vN).
   if d_ov!=output domain of variable ov
     //variable vi not affecting the reduction of domain of output variable ov
     UD(vi)=ID(vi)
     vs=UNION(vs, vi)
return vs
In case of a failed CSP (empty set reached):
Let fp be the failed propagation
Let v be one of the variables of fp
eg=findExplanation(fp, v)
return eg The various method embodiments of the invention will be generally implemented by a computer executing a sequence of program instructions for carrying out the steps of the method, assuming all required data for processing is accessible to the computer. The sequence of program instructions may be embodied in a computer program product comprising media storing the program instructions. As will be readily apparent to those skilled in the art, the present invention can be realized in hardware, software, or a combination of hardware and software. Any kind of computer/server system(s)— or other apparatus adapted for carrying out the methods described herein—is suited. A typical combination of hardware and software could be a general-purpose computer system with a computer program that, when loaded and executed, carries out the method, and variations on the method as described herein. Alternatively, a specific use computer, containing specialized hardware for carrying out one or more of the functional tasks of the invention, could be utilized.

A computer-based system 400 is depicted in FIG. 4 by which the method of the present invention may be carried out. Computer system 400 includes a processing unit 441, which houses a processor, memory and other systems components that implement a general purpose processing system or computer that may execute a computer program product. The computer program product may comprise media, for example a compact storage medium such as a compact disc, which may be read by the processing unit 441 through a disc drive 442, or by any means known to the skilled artisan for providing the computer program product to the general purpose processing system for execution thereby.

The computer program product comprises all the respective features enabling the implementation of the methods described herein, and which—when loaded in a computer system—is able to carry out these methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer program product may be stored on hard disk drives within processing unit 441 (as mentioned) or may be located on a remote system such as a server 443, coupled to processing unit 441, via a network interface such as an Ethernet interface. Monitor 444, mouse 445 and keyboard 446 are coupled to the processing unit 441, to provide user interaction. Scanner 447 and printer 448 are provided for document input and output. Printer 448 is shown coupled to the processing unit 441 via a network connection, but may be coupled directly to the processing unit. Scanner 447 is shown coupled to the processing unit 441 directly, but it should be understood that such peripherals may be network coupled, or direct coupled without affecting the ability of the processing unit 441 to perform the method of the invention.

Preferably, the computer-implemented method includes finding a minimal explanation for said solution, and the augmenting of the constraint operators that is carried out to supply the explanation may include operating first on a last propagation. For that matter, the method preferably includes that the step of augmenting determines which variables contributed to a reduction of domain of a particular variable. More, the inventive method also preferably includes executing the same propagator with the same input domains such that each iteration operates on an initial domain of one of the variables as its input domain in lieu of its original domain at the time of propagation.

Although a few examples of the present invention have been shown and described, it would be appreciated by those skilled in the art that changes may be made in these embodiments without departing from the principles and spirit of the invention, the scope of which is defined in the claims and their equivalents.

What is claimed is:

1. A computer implemented method for generating an explanation of a solution to a constraint satisfaction problem (CSP), said computer implemented method comprising the steps of:

providing a CSP solution having assigned values to variables that are consistent with constraints defined for each variable;

determining which variables contributed to a reduction of a domain of a desired output variable in a given propagation, said determining comprising:

traversing said CSP solution and, at each propagation node traversed, iteratively executing the same corresponding propagator at the propagation node used to reduce the variable domain, wherein, at each iteration:

executing a same corresponding propagator with the input domain being an initial domain of one of the input variables "vi" instead of its original domain at the time of the propagation;

determining a corresponding output domain "d_ov" returned by the activation of the same propagator p with the input domain of the input variable being said initial domain of one of the variables; and, determining whether the returned "d_ov" is equal to an output domain of the desired output variable corresponding to the output variable at the time of propagation; and, if not equal, then the input variable "vi" does not affect the reduction of domain of the desired output variable; otherwise, determining that the replaced variable "vi" does affect the reduction of domain of the desired output variable; and, augmenting the constraints to supply an explanation for particular values assigned to said variables, and constraints defined over said variable utilized in said solution.

2. A computer program product, the computer program product comprising; a tangible storage medium readable by a processing circuit and storing instructions for execution by the processing circuit for performing a method as set forth in claim 1.

* * * * *